May 1, 1956 J. S. LACEY 2,744,065
HOME AQUARIUM CIRCULATOR AND AERATOR
Filed April 13, 1954
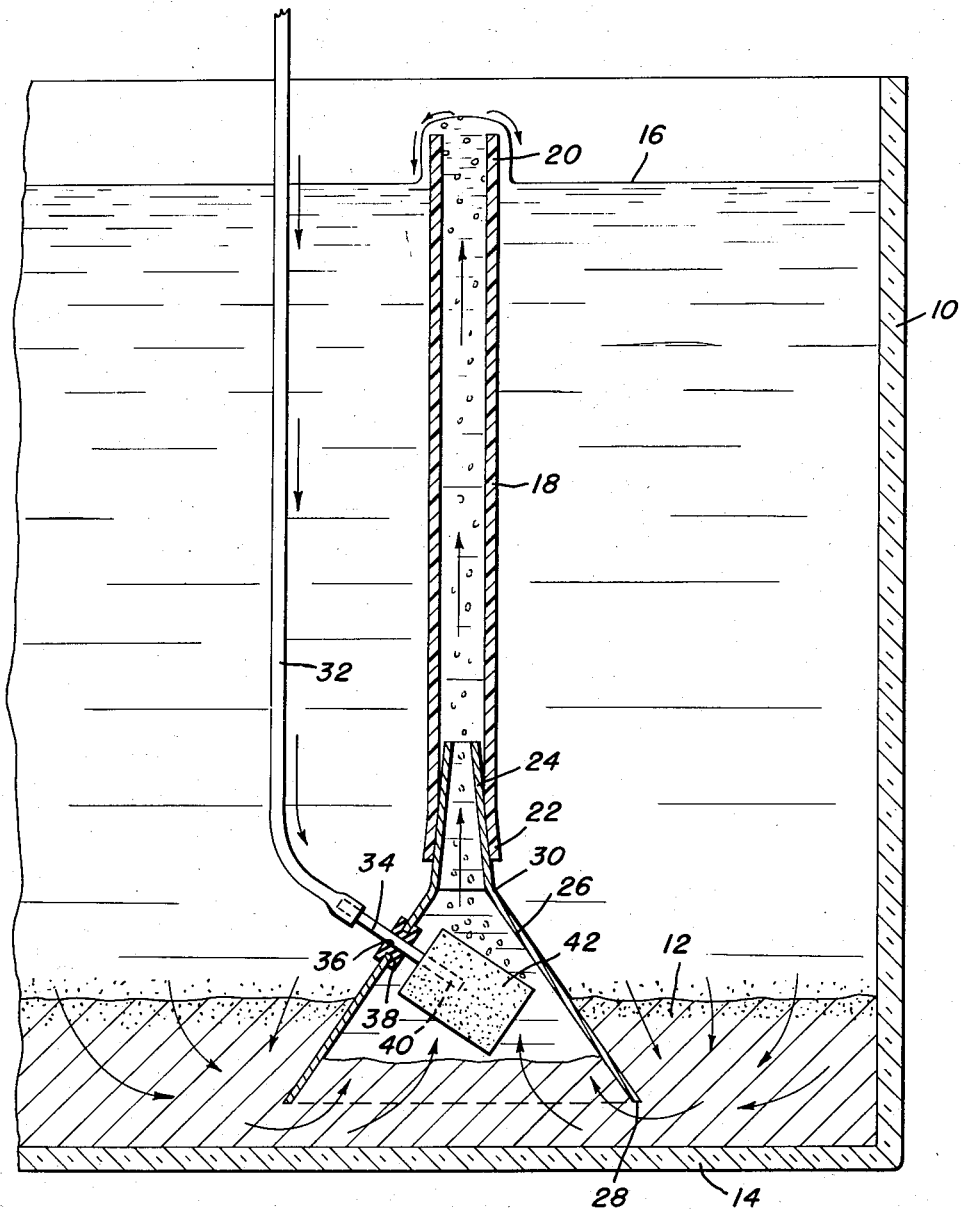
INVENTOR
Joseph S. Lacey
BY Frank C. Maley
AGENT

United States Patent Office 2,744,065
Patented May 1, 1956

2,744,065

HOME AQUARIUM CIRCULATOR AND AERATOR

Joseph S. Lacey, Washington, D. C.

Application April 13, 1954, Serial No. 422,760

1 Claim. (Cl. 210—16)

This invention relates to improvements in devices for use in connection with home aquariums for circulating, filtering and aerating the water in the aquariums.

The primary object of this invention is to clean and aerate the water in home aquariums and to provide improved water conditions in the aquariums.

Another important object of this invention is to provide means for constantly circulating the water in the aquarium, the putrid water being pulled from the sand in the bottom of the tank and being filtered and aerated as it is drawn through a vertical tube in the tank and discharged at the water surface.

Another object of this invention is to provide a tube, which is vertically disposed in the water, and which has a conical shaped member attached to its lower end, the base of such member being open and being embedded in the sand in the bottom of the tank and to provide an air tube which is extended through the side wall of the conical member adjacent to the apex thereof and which has a porous air stone attached to its end within the conical member. As the air enters the porous stone, it is broken up into many small bubbles which travel up through the tube to the water surface where they are released. As the bubbles travel upwardly in the tube, they create a venturi action in the conical member to suck in the putrid water from the sand, the sucked-in water being aerated by coming in immediate contact with the many air bubbles released by the stone. The air bubbles present a much larger area to the stagnant or putrid water while it is still concentrated in the conical member, and remain in contact with such water longer as it travels up the tube. The water above the sand replaces the water sucked from the sand by the venturi action and, thus, a complete and constant circulation of water from the open base end of the conical member and the upper end of the tube is obtained.

Any suspended material in the water gravitates into the sand and is filtered from the water. Thus, a combined aerating and filtering action is obtained with an effective and constant circulation of the water.

It is, therefore, among the objects of the instant invention to provide a device for the above-desired purpose, which does not need frequent cleaning, which does not employ any additional filters or additional filtering material and which operates efficiently on a minimum of power.

The foregoing and ancillary objects are attained by this invention, the preferred embodiment of which is set forth by way of example in the following description and illustrated in the accompanying drawing, wherein the figure is a vertical sectional view of an aquarium provided with a filtering and aerating device made in accordance with the instant invention, parts of the device being shown in section.

Referring now more particularly to the drawing, the numeral 10 represents a conventional tank or aquarium, which as is conventional, is provided with a bed of sand 12 on its bottom 14. The sand may be of any desired depth but usually is only of a few inches in depth. The aquarium is filled with water to the level 16.

A vertical tube 18, which is preferably formed of plastic is disposed within the tank preferably adjacent one of the side walls thereof. The tube 18 has its upper end 20 projecting above the water level 16 and its lower end 22 is slightly flared outwardly to receive a tapered neck 24. The neck is integral with a conical member 26. The member 26 has an open base end 28 which is embedded in the sand and is spaced vertically from the bottom 14 of the aquarium. The conical member 26 may be easily embedded in the sand 12 and can be removed without unduly disturbing the sand. The neck 24 extends axially from the open minor end or apex 30 of the member 26 and is frictionally inserted in the end 22 of the tube 18. A small plastic air tube 32 is attached at its enlarged lower end to a tube 34 which projects through an opening 36 in the side wall of the member 26. The opening 36 is formed by a resilient gasket 38, which prevents the air from escaping through the side wall of the member 26.

The tube 34 extends diagonally through the side wall and is slidably disposed through the gasket 38, as shown in the drawing, and has its inner end 40 disposed substantially at the center line of the member 26. A porous air stone 42 is fixedly circumposed at one end of the tube and is diagonally disposed in the center of the member 26. Air under low pressure is introduced into the aquarium through the small plastic air tube 32 and passes through the tube 34 to be released through the porous stone 42 where the air is broken up into many small bubbles which travel up through the neck 24 and the tube 18 to the top of the tube where they are released onto the water surface 16. These bubbles force water out of the tube 18 as they travel upwardly to bubble over at the top of the tube. The mixture of air and water in the member 26 has a lower specific gravity than that of water alone and the rising air bubbles exert a lifting force on the water.

The release of the bubbles in a concentrated manner in the member 26 produces a venturi action, which sucks in the putrid or stagnant water in the sand 12 under the base of the member 26. The putrid or stagnant water is thus pulled in or sucked into the member 26, as indicated by the arrows in the drawing. The water drawn into the member 26 is replaced by the water above the sand and the water is constantly drawn down, the water level being replaced by the water bubbling over at the top of the tube 18.

It is to be particularly noted that the stagnant water is concentrated in an area within the member 26 due to the shape of the member 26 and the water comes in immediate contact with many air bubbles released by the stone 42. Due to the conical shape of the member 26 at its upper end, the air bubbles are retained in longer contact with the stagnant or putrid water as it is forced up the tube 18.

It is to be also noted that any suspended or foreign materal in the water will be pulled down into the sand and filtered by the sand from the water.

Because of the simplicity of the device and the few parts, it can be easily removed from the aquarium for cleaning, without disturbing the whole tank. Because of the air lift action an efficient and constant circulation is provided as distinguishing from the slow and sluggish action of conventional gravity siphon devices.

While the preferred embodiment of the invention is set forth in the above description and illustrated in the accompanying drawing, it is to be understood that other forms may be realized as come within the scope of the appended claim.

I claim:

A device for aerating and filtering water in an aquarium which comprises a tank containing water and having a bed of aquarium sand or the like over the bottom thereof; said device comprising a cylindrical, open ended water-tube disposed vertically in the tank and having an upper open end disposed vertically above the surface of the water in the tank and a lower open end slightly outwardly flared and positioned above the sand bed, a frustoconical base member having an open base end vertically embedded in the bed of sand above the bottom of the tank and having an open apex end positioned above the bed of sand, an axially tapered, tubular axial extension on the apex end of the base member and integral therewith, said extension being frictionally fitted in the lower end of the water-tube to establish a water and air tight joint between the water-tube and base member, said water-tube being supported in a vertical position by the base member, a side wall of the base member, adjacent the apex end, being formed with an opening, a gasket fitted in the opening, an air tube slidably positioned through the gasket and extending into the base member below the extension and disposed at an acute angle to the axis of the extension and water-tube and having an inner end disposed within the base member, and a porous air stone fixedly circumposed on the inner end of the air tube and disposed within the base member.

References Cited in the file of this patent

UNITED STATES PATENTS

| | | |
|---|---|---|
| 44,876 | McKnight | Nov. 1, 1864 |
| 655,479 | De Mont et al. | Aug. 7, 1900 |
| 1,574,783 | Beth | Mar. 2, 1926 |
| 2,008,363 | Maris | July 16, 1935 |
| 2,614,529 | Hansen | Oct. 21, 1952 |
| 2,674,574 | Pettas | Apr. 6, 1954 |
| 2,676,921 | Vansteenkiste | Apr. 27, 1954 |